(12) United States Patent
Fuchs et al.

(10) Patent No.: US 8,123,287 B2
(45) Date of Patent: Feb. 28, 2012

(54) ROOF FOR A MOTOR VEHICLE

(75) Inventors: Michael Fuchs, Fulda (DE);
Joachim-Günther Loitz, Alzey (DE);
Andreas Rogge, Dom-Dürkheim (DE)

(73) Assignee: GM Global Technology Operations LLC, Detroit, MI (US)

(*) Notice: Subject to any disclaimer, the term of this patent is extended or adjusted under 35 U.S.C. 154(b) by 14 days.

(21) Appl. No.: 12/096,900

(22) PCT Filed: Nov. 23, 2006

(86) PCT No.: PCT/EP2006/011221
§ 371 (c)(1),
(2), (4) Date: Nov. 7, 2008

(87) PCT Pub. No.: WO2007/068333
PCT Pub. Date: Jun. 21, 2007

(65) Prior Publication Data
US 2009/0152903 A1    Jun. 18, 2009

(30) Foreign Application Priority Data

Dec. 13, 2005 (DE) .......................... 10 2005 059 258

(51) Int. Cl.
*B62D 25/06* (2006.01)
*B60R 9/058* (2006.01)

(52) U.S. Cl. ........................ 296/210; 296/213; 224/329

(58) Field of Classification Search .................. 296/210, 296/213; 224/329
See application file for complete search history.

(56) References Cited

U.S. PATENT DOCUMENTS 4,002,360 A    1/1977    Frank et al.
(Continued)

FOREIGN PATENT DOCUMENTS

DE    2345496 A1    3/1975
(Continued)

OTHER PUBLICATIONS

International Searching Authority, International Search Report for European Application No. PCT/EP2006/011221, dated Jun. 3, 2007.

(Continued)

*Primary Examiner* — Dennis H Pedder
(74) *Attorney, Agent, or Firm* — Ingrassia Fisher & Lorenz, P.C.

(57) ABSTRACT

A roof for a motor vehicle incorporating a roof channel has a cage with a slider guided therein in the vicinity of a retaining means for a roof rack. The slider can be displaced in the cage from a position closing the roof rack opening into a position exposing the roof rack opening. In addition, the cage holds a cover strip for the roof channel. The slider and the cage are made from a synthetic material and can be produced and installed in a particularly economical manner.

14 Claims, 2 Drawing Sheets

U.S. PATENT DOCUMENTS 5,954,251 A * 9/1999 Tress et al. .................... 224/309
6,974,181 B2 * 12/2005 Mikkaichi et al. ............ 296/210

FOREIGN PATENT DOCUMENTS

| | | |
|---|---|---|
| DE | 3313327 A1 | 10/1984 |
| DE | 29514216 U1 | 4/1996 |
| DE | 9606688 A1 | 9/1996 |
| DE | 19840295 | 3/2000 |
| DE | 202005005121 U1 | 8/2006 |
| EP | 0553415 * | 11/1992 |
| EP | 0730998 * | 9/1996 |
| EP | 0827869 | 3/1998 |
| EP | 1155917 * | 11/2001 |
| EP | 1469150 A2 | 10/2004 |
| EP | 1498318 A2 | 1/2005 |
| GB | 2137944 A | 10/1984 |
| GB | 2208173 A | 3/1989 |
| JP | 6344833 | 12/1994 |

OTHER PUBLICATIONS

German Patent Office, German Search Report for Application No. 102005059258.9, dated Nov. 26, 2007.

* cited by examiner

ROOF FOR A MOTOR VEHICLE

CROSS-REFERENCE TO RELATED APPLICATIONS

This application is a U.S. National-Stage entry under 35 U.S.C. §371 based on International Application No. PCT/EP2006/011221, filed Nov. 23, 2006, which was published under PCT Article 21(2) and which claims priority to German Application No. 102005059258.9, filed Dec. 13, 2005, which are all hereby incorporated in their entirety by reference.

TECHNICAL FIELD

The invention relates to a roof for a motor vehicle comprising a roof channel having a cover strip for covering the roof channel, a selectively closable or openable roof rack opening and a retaining means for holding a roof rack arranged in the vicinity of the roof rack opening.

BACKGROUND

A roof having a roof rack is frequently used in modern motor vehicles and is well-known in practice. The roof rack opening enables a roof rack to be mounted, for example, in a retaining bracket arranged in the roof channel. The cover strip has a cut-out in the vicinity of the roof rack opening. The roof rack opening is closed when a roof rack is not installed. In motor vehicles known in practice, closure of the roof rack opening is effected by means of a loose cover inserted into the cut-out in the cover strip for example. However, such a cover can easily be lost and is difficult to install and remove. Furthermore, hinged covers and covers displaceable in the cover strip are also known in practice. These displaceable and hinged covers however must be guided or stored in a very complex manner. In addition, the hinged covers require a large amount of space.

At least one object is to develop a roof of the type mentioned hereinabove in such a way that it is producible in a particularly economical manner and will enable closure and exposure of the roof rack opening to be effected in a comfortable manner. In addition, other objects, desirable features, and characteristics will become apparent from the subsequent summary, detailed description, and the appended claims, taken in conjunction with the accompanying drawings and this background.

SUMMARY

In accordance with an exemplary embodiment of the invention, the at least one object and other objects, desirable features and characteristics, is provided in that a cage and a slider are arranged in the roof rack opening, in that the cage is arranged in the vicinity of the retaining means for the roof rack and in that the slider is guided in the cage in longitudinally displaceable manner from a position closing the roof rack opening into a position exposing the roof rack opening.

Due to this design, the slider is guided in the cage and cannot get lost. The exposure and closure of the roof rack opening is thereby made particularly convenient. In addition, the roof utilizes a particularly small number of components and can therefore be manufactured in an economical manner. Since the cover strip does not need to have a guidance or storage function for the slider, it can be made from a flat material in an economical manner. Preferably, the cage frames the retaining means for the roof rack.

The roof in accordance with and exemplary embodiment of the invention can be installed in a particularly economical manner if the cage and the slider form a structural unit which can be pre-assembled.

In accordance with another advantageous further development, flush attachment of the cover strip to the cage can be produced in a simple manner if the cover strip has a cut-out comprising the roof rack opening and if an edge of the cover strip bordering the cut-out rests on the cage. Wind turbulence in the vicinity of the cut-out for the fixing means when in motion is thereby prevented. Furthermore, the flush-fitting attachment of the cover strip is optically appealing.

In accordance with another advantageous further development, the slider is kept reliably in place in the position closing the roof rack opening if the cage has an opening and the slider has a raised portion penetrating in matching manner into the opening. Furthermore, this design enables one to have a flush blanked-off surface between the cage and the slider in the closed position thereof and allows latching of the slider in the cage.

The complexity of the structure for reliably retaining the slider in the opening in the cage can be kept particularly low in accordance with another advantageous further development, if the slider has a locating edge around the raised portion.

In accordance with another advantageous further development, reliable retention of the slider in the position closing the roof rack opening can be ensured in a simple manner if the cage has a spring element for biasing the slider into the opening.

The structural unit which can be pre-assembled and consists of the slider and the cage can be constructed in a particularly simple manner in accordance with another advantageous further development, if the cage comprises a guide means for the slider.

The structural complexity of the guide means for the slider can be kept particularly low in accordance with another advantageous further development, if the guide means of the cage has guide ways each embracing a respective lateral edge of the slider as seen in the direction of displacement.

In accordance with another advantageous further development, the slider can be guided under the cover strip in the course of the movement into the position exposing the roof rack opening, if a guide channel adjoins each guide way in alignment therewith and if the guide channel is arranged closer to the base of the roof channel than the guide way.

For the purposes of further simplifying the handling of the slider, it is a contributory factor in accordance with another advantageous further development if the cage and the slider comprise mutually corresponding latching means for the retention of the slider in the position closing the roof rack opening and/or in the position of the slider exposing the roof rack opening.

The retention of the slider in the intended position with respect to the cage is particularly simple in accordance with another advantageous further development, if the slider has a protruding nose at one end and if the spring element of the cage is biased against the nose. Preferably, the nose is arranged on an end of the slider.

The range of movement of the slider can be limited in a simple manner in accordance with another advantageous further development, if the slider has a stop hook and if the stop hook abuts the cage in the position exposing the roof rack opening. It can thereby be ensured in a simple manner that the slider can also be gripped in the position exposing the roof rack opening in order to move it back again into the position closing the roof rack opening.

A complex arrangement of spring elements or the like on the slider can be avoided in a simple manner in accordance with another advantageous further development, if the slider is resilient. This design enablers the slider to be biased into the opening in the cage by virtue of its elasticity and thus held reliably therein. By applying pressure to the slider, the slider can be deformed and one end thereof pressed out of the opening of the cage and pushed into the guide channel.

For the purposes of further decreasing the manufacturing costs of the roof in accordance with an exemplary embodiment of the invention, it is a contributory factor if the slider and the cage are made from a synthetic material. Furthermore, the slider can thereby be easily bent in order to press it into the guide channel of the cage during its movement into the position exposing the roof rack opening.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary or background or the following detailed description.

Figure 1:
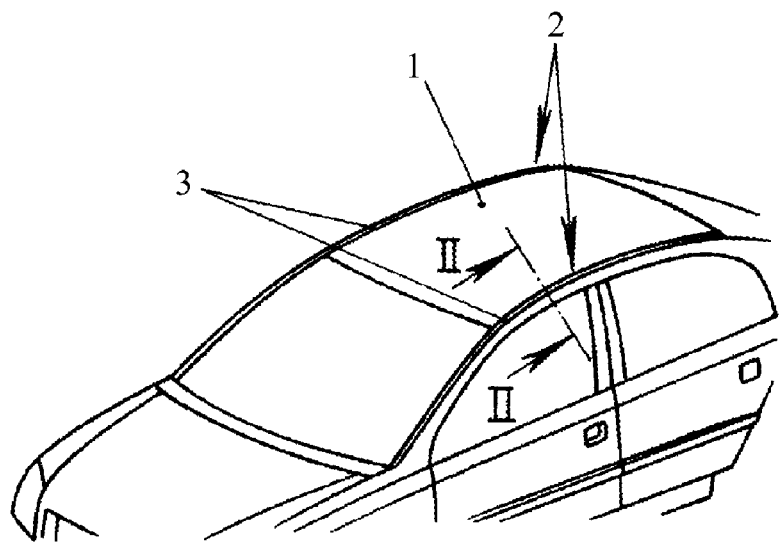
FIG. 1 shows a perspective view of a roof of a motor vehicle with a roof in accordance with an exemplary of the invention.

FIG. 1 shows a motor vehicle with a roof 1 and roof channels 2 arranged along the sides of the roof 1. The roof channels 2 are each closed by a cover strip 3.

Figure 2:
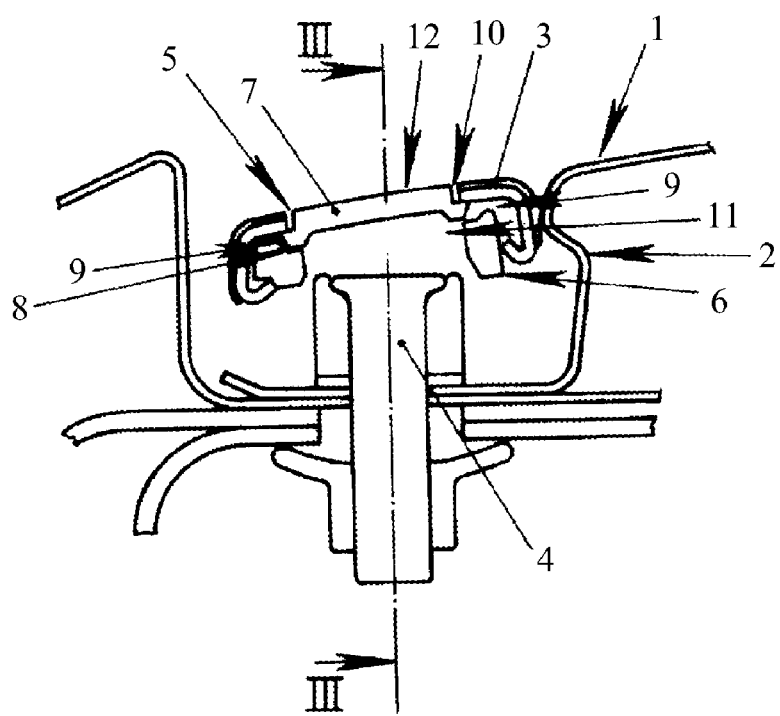
FIG. 2 shows a greatly enlarged sectional view through the roof in accordance with an exemplary embodiment of the invention along the line II-II in FIG. 1.

FIG. 2 shows a greatly enlarged sectional view through the roof 1 of FIG. 1 in the form of a sectional view along the line II-II in the vicinity of one of several retaining means 4 for a not illustrated roof rack. The retaining means 4 are fixed in the base of the roof channels 2 below a roof rack opening 5 in the cover strip 3. A cage 6 is fixed in the roof channel 2 in the vicinity of the retaining means 4, a slider 7 being guided in displaceable manner in said cage in a direction perpendicular to the plane of the drawing and thus along the roof channel 2. For this purpose, the cage 6 has a guide means 8 for the slider 7. Lateral guide ways 9 of the guide means 8 of the cage 6 support an outer edge of the slider 7. The cover strip 3 has a cut-out 10 in the vicinity of the roof rack opening 5 and an edge thereof abuts the cage 6. The cage 6 has an opening 11 that is provided for permitting the roof rack to be inserted into the retaining means 4, this opening being closed in the illustrated position of the slider 7. The slider 7 has a raised portion 12 in the central area thereof, said portion blanking off the cover strip 3 in flush-fitting manner.

Figure 3:
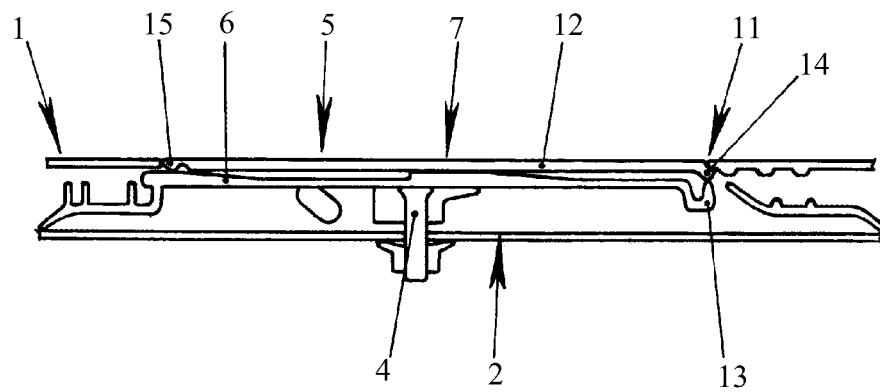
FIG. 3 shows a sectional view through the roof in accordance with an exemplary embodiment of the invention along the line III-III in FIG. 2 in a closed position of a roof rack opening.

FIG. 3 shows the roof in the form of a sectional view through the roof 1 along the line III-III in FIG. 2 in the position of the slider 7 closing the roof rack opening 5. It can be seen here that the slider 7 is biased into the opening 11 by a spring element 13 of the cage 6. The cage 6 is supported on the base of the roof channel 2. At one end thereof, the slider 7 has a protruding nose 14 which is biased by the spring element 13. The raised portion 12 of the slider 7 is thereby pressed into the opening 11 of the cage 6 and the slider 7 is latched in the illustrated position. At the opposite end thereof, the slider 7 has a stop hook 15. The slider 7 and the cage 6 are resilient and made from synthetic material.

Figure 4:
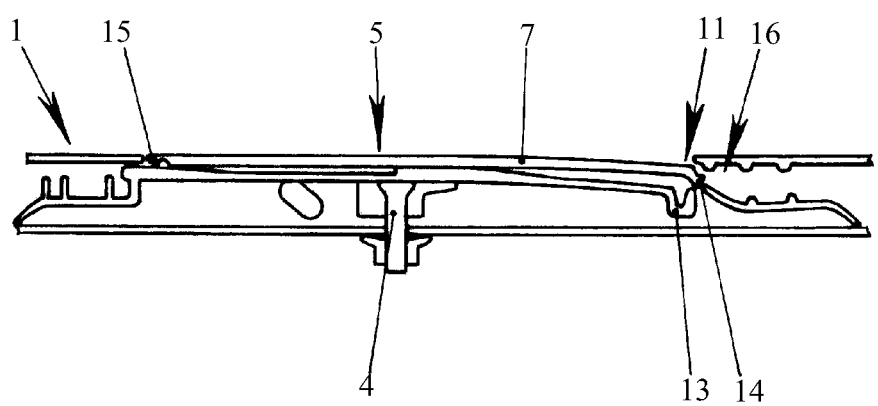
FIG. 4 shows the roof in accordance with an exemplary embodiment of the invention from FIG. 3 when opening the roof rack opening and FIG. 5 shows the roof in accordance with an exemplary embodiment of the invention from FIG. 3 in the exposed position of the roof rack opening.
Figure 5:
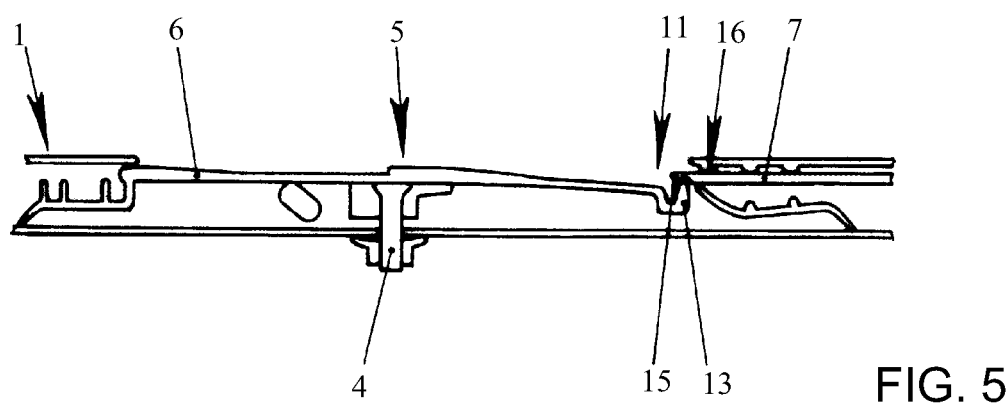

For the purposes of exposing the roof rack opening 5, the slider 7 can be pressed down at one end against the force of the spring element 13 of the cage 6, as is illustrated in FIG. 4. Subsequently, the slider 7 can be pushed in the longitudinal direction thereof into a guide channel 16 of the cage 6, as is illustrated in FIG. 5. Hereby, the slider 7 is held on the cage 6 by the stop hook 15. In FIG. 5, the roof 1 is illustrated in the position of the slider 7 exposing the roof rack opening 5. The retaining means 4 for the roof rack are then freely accessible.

While at least one exemplary embodiment has been presented in the foregoing detailed description, it should be appreciated that a vast number of variations exist. It should also be appreciated that the exemplary embodiment or exemplary embodiments are only examples, and are not intended to limit scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

LIST OF REFERENCE SYMBOLS 1 roof
2 roof channel
3 cover strip
4 retaining means
5 roof rack opening
6 cage
7 slider
8 guide means
9 guide way
10 cut-out
11 opening
12 raised portion
13 spring element
14 nose
15 stop hook
16 guide channel

The invention claimed is:

1. A roof for a motor vehicle comprising:
a roof channel;
a cover strip for covering the roof channel;
a selectively closable and openable roof rack opening;
a retaining member adapted to hold a roof rack arranged in the vicinity of the roof rack opening; and
a cage fixed in the roof channel, the cage positioned below the cover strip and engaged with both the cover strip and a floor of the roof channel, the cage having a slider disposed in the roof rack opening, wherein the cage is further arranged in a vicinity of the retaining member for the roof rack and the slider is guided in the cage in a longitudinally displaceable manner from a position closing the roof rack opening into a position exposing the roof rack opening wherein the cover strip and the cage are each separate and distinct components, and wherein the cage is in direct contact with the floor of the roof channel.

2. A roof for a motor vehicle in accordance with claim 1, wherein the cage and the slider form a structural unit which can be pre-assembled.

3. A roof for a motor vehicle in accordance with claim 1, further comprising a cover strip comprising a cut-out including the roof rack opening and an edge of the cover strip bordering the cut-out abuts the cage.

4. A roof for a motor vehicle in accordance with claim 1, wherein the cage has an opening and the slider has a raised portion penetrating in a matching manner into the opening.

5. A roof for a motor vehicle in accordance with claim 4, wherein the slider has a locating edge surrounding the raised portion.

6. A roof for a motor vehicle in accordance with claim 1, wherein the cage has a spring element biasing the slider into the opening.

7. A roof for a motor vehicle in accordance with claim 1, wherein the cage comprises a guide adapted for the slider.

8. A roof for a motor vehicle in accordance with claim 7, wherein the guide comprises a guide ways that each embrace a respective lateral edge of the slider as seen in a direction of displacement.

9. A roof for a motor vehicle in accordance with claim 8, wherein a guide channel adjoins the guide ways in alignment therewith and the guide channel is arranged closer to the base of the roof channel than the guide ways.

10. A roof for a motor vehicle in accordance with claim 1, wherein the cage and the slider comprise mutually corresponding latches adapted for retention of the slider in the position closing the roof rack opening and in the position of the slider exposing the roof rack opening.

11. A roof for a motor vehicle in accordance with claim 1, wherein the slider has a protruding nose at one end, wherein the cage has a spring element biasing the slider into the opening and wherein the spring element of the cage is biased against the nose.

12. A roof for a motor vehicle in accordance with claim 1, wherein the slider has a stop hook that abuts the cage in the position exposing the roof rack opening.

13. A roof for a motor vehicle in accordance with claim 1, wherein the slider is resilient.

14. A roof for a motor vehicle in accordance claim 1, wherein the slider and the cage are made from a synthetic material.

* * * * *